United States Patent [19]

Côme et al.

[11] Patent Number: 4,615,098
[45] Date of Patent: Oct. 7, 1986

[54] PROCESS FOR FORMING AN HYDRAULIC CONNECTION

[75] Inventors: Philippe Côme, Dammartin-en-Goëlle; Joël Vasselet, Rosny-sous-Bois, both of France

[73] Assignee: Societe Anonyme D.B.A., Paris, France

[21] Appl. No.: 606,003

[22] Filed: May 2, 1984

[30] Foreign Application Priority Data

Apr. 13, 1983 [FR] France ................. 83 06007

[51] Int. Cl.[4] ............... B23P 11/00; B21D 53/00
[52] U.S. Cl. .................. 29/512; 29/157 R; 285/330
[58] Field of Search ............. 29/512, 157 R; 285/330

[56] References Cited

U.S. PATENT DOCUMENTS

| | | | |
|---|---|---|---|
| 2,112,673 | 3/1938 | Lewis | 29/148.2 |
| 2,290,619 | 7/1942 | Rieger | 29/512 |
| 3,002,582 | 10/1961 | Marcelis | 29/512 UX |
| 3,064,070 | 11/1962 | Walts | 153/2 |
| 3,263,311 | 8/1966 | Riedhammer et al. | 29/512 |
| 4,192,531 | 3/1980 | Williams et al. | 285/222 |

FOREIGN PATENT DOCUMENTS 2508138 12/1982 France .

Primary Examiner—Howard N. Goldberg
Assistant Examiner—R. S. Wallace
Attorney, Agent, or Firm—Ken C. Decker; Larry J. Palguta

[57] ABSTRACT

Process for forming an hydraulic connection on a hollow body 10, for example a master cylinder, by fitting an interconnecting piece 24 onto a tubular protuberance 16 projecting outwards from the wall of the body 10. The protuberance has at least one thin-walled part which, when the interconnecting piece 24 has been fitted over the protuberance 16, is flanged outwards against an internal bearing surface 38 of the interconnecting piece 24.

4 Claims, 14 Drawing Figures

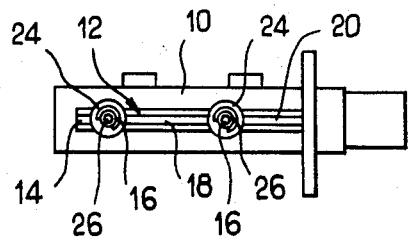
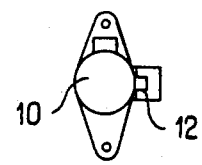
FIG.1  FIG.2
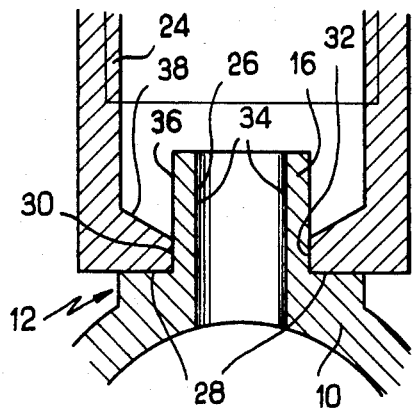
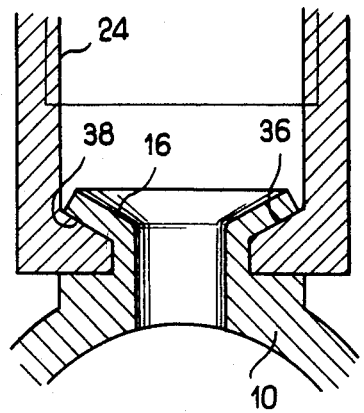
FIG.3  FIG.4
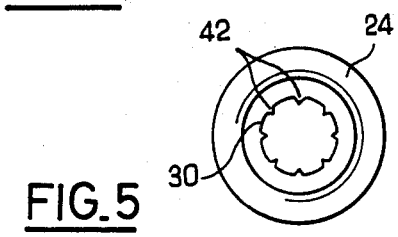
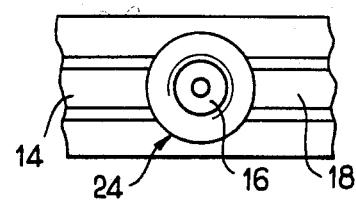
FIG.5  FIG.7
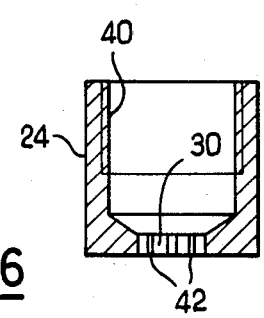
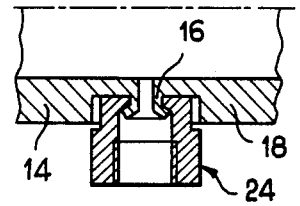
FIG.6  FIG.8

PROCESS FOR FORMING AN HYDRAULIC CONNECTION

The present invention concerns a process for forming an hydraulic connection on a hollow body and, more particularly, forming such a connection on a tubular piece made of extruded metal.

For economic reasons, it is desirable that the wall of an extruded tubular piece be thin, but this has disadvantages, because an hydraulic connection cannot be formed directly in the well. Hitherto it has been proposed to form the connection by means of a collar around the tubular piece, the collar being thick enough to receive a tapped connector. This technique, however, presents problems concerning the seal between the collar and the tubular piece. It has also been proposed to weld an interconnecting piece onto the external surface of the tubular piece, with the associated disadvantages.

The object of the present invention is to propose a means of forming an hydraulic connection, on a hollow body, which is fluid-tight and of a simple and reliable configuration.

To achieve this, the invention proposes a process for forming an hydraulic connection on a hollow body, by fitting an interconnecting piece onto a protuberance projecting outwards from the wall of the body and having a passage communicating with the interior of the body, characterized in that it comprises the stages of forming the protuberance so that it has at least one external tubular part with a thin wall surrounding the passage, of fitting the interconnecting piece over the tubular part, and of flanging outwards the extremity of this tubular wall against a corresponding internal bearing surface of the interconnecting piece.

Other characteristics and advantages of the present invention will emerge from the following description of embodiments, given by way of illustration but in no way implying a limitation, made with reference to the attached drawings, in which:

FIG. 1 is a plan view of a master cylinder fitted with an hydraulic connection according to the invention;

FIG. 2 is an end view of the master cylinder of FIG. 1;

FIG. 3 is a cross-sectional view of an intermediate stage in the formation of an hydraulic connection according to the invention;

FIG. 4 is a view of an embodiment similar to FIG. 3 showing the final configuration of the connection;

FIG. 5 is a plan view of a first embodiment of a connecting piece for realising an hydraulic connection according to the invention;

FIG. 6 is a cross-sectional view of the interconnecting piece of FIG. 5.

FIG. 7 is a plan view of an hydraulic connection of FIGS. 5 and 6 fitted onto a master cylinder;

FIG. 8 is a cross-sectional view of the piece in FIG. 7;

Figure 9:
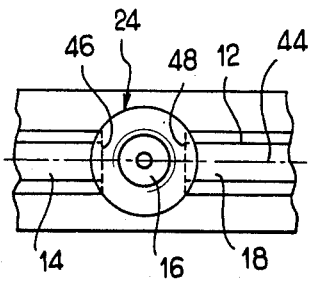
FIGS. 9 and 10 are the respective plan views of two other embodiments of a connection according to the invention.

As shown in the figures, a tubular piece, which in the example illustrated is a master cylinder, comprises a hollow body 10. The body 10 is provided with an external projection 12. The body 10 and the projection 12 are formed in one piece, in the shape of a tubular extrusion, after which parts of the extrusion are removed to leave separate areas 14, 16, 18 and 20. Two of these areas 16 each form a cylindrical protuberance to receive an interconnection piece 24. The two protuberances 16 are machined to form passages 26. As shown in FIG. 3, the projection 12 includes a bearing surface 28 which, because the protuberance 16 has a cylindrical shape, is substantially annular. The interconnecting piece 24 bears against the surface 28, the internal annular surface 30 of the piece 24 being in contact with the external surface 32 of the protuberance 16. So that the interconnecting piece 24 is held on the body 10, the cylindrical wall 34 of the protuberance 16 is flanged into the position shown in FIG. 4 in which the external surface 36 of the protuberance bears against the internal conical surface 38 of the piece 24.

FIGS. 5 to 8 show a first embodiment which serves to prevent the interconnecting piece 24 from turning about its longitudinal axis when a brake circuit tube is screwed into the tapped part 40 of the piece 24. The internal surface 30 of the interconnecting piece is here provided with several teeth 42 which, when the piece 24 is force-fitted onto the cylindrical protuberance 16, penetrate the external surface 36 of the piece 16. The cylindrical wall 34 of the protuberance 16 is flanged as before to retain the piece 24.

Figure 11:
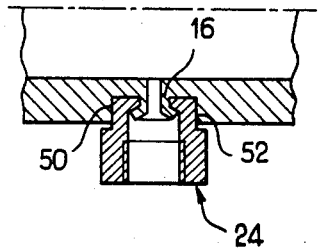
FIGS. 11 and 12 are respectively cross-sectional views of the connections in FIGS. 9 and 10.

In the embodiment in FIGS. 9 and 11, the two faces opposite the separated areas 14, 18 of the projection 12 are formed perpendicular to the longitudinal axis 44 of the body 10 of the master cylinder and form two bearing surfaces 46 and 48. The interconnecting piece 24 is provided externally with two flat faces 50 and 52 which, when the piece 24 is in position around the protuberance 16, come into contact with the bearing surfaces 46 and 48 and by this means the interconnecting piece 24 is prevented from turning.

Figure 10:
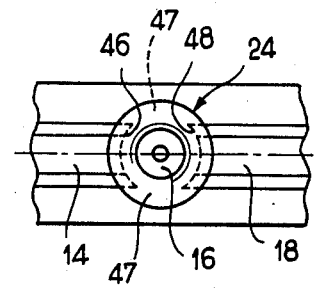
Figure 12:
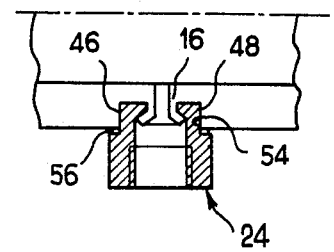

FIGS. 10 and 12 show another embodiment in which the two faces 46 and 48 of the separated areas have each an arcuate shape which come into contact with the cylindrical external surface 54 of the interconnecting piece 24. The interconnecting piece 24 is formed with two partial countersinkings 56 produced in the side wall of the piece 24 so as to define diametrically opposite housings 47 into which are engaged the opposite extremities of the shape 14, 18 on both sides of the protuberance 16. The interconnecting piece is by thus prevented from turning.

Figure 13:
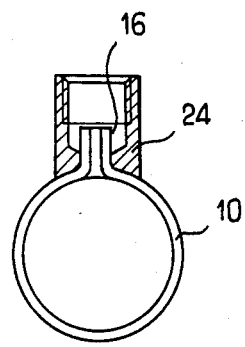
FIG. 13 is a cross-sectional view of a fifth embodiment prior to crimping.
Figure 14:
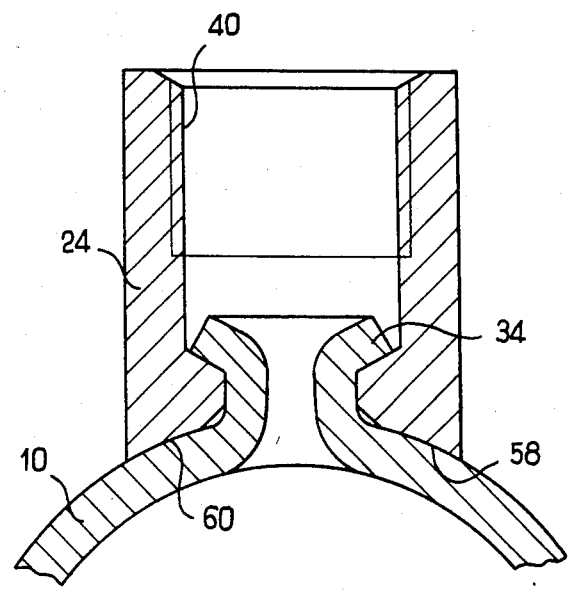
FIG. 14 is an enlarged view of FIG. 13 after crimping.

In the embodiment of FIGS. 13 and 14, the protuberance 16 is formed directly by local drawing, radially towards the exterior of an extruded tubular body 10. As in the preceding embodiments, the interconnecting piece 24 is positioned on the cylindrical protuberance 16 and the wall 34 is flanged so as to hold the piece 24 in position. The interconnecting piece 24 has a lower surface 58 of substantially cylindrical form which comes into contact with the external cylindrical surface 60 of the body 10 and therefore the piece 24 is prevented from turning.

In the different embodiments, it will be noted that the flared and flanged extremity 34 of the protuberance 16 constitutes inside the interconnecting piece 24, a seat for the tube screwed into this piece, thereby ensuring that the assembly has a perfect fluid-tight seal.

We claim:

1. Method of manufacturing a master cylinder comprising the steps of forming an elongated hollow body by extrusion, said body defining a bore therewithin, forming a protuberance extending radially outwardly from the hollow body, forming a passage in said protuberance communicatings with said bore, providing an annular interconnecting piece having an inner wall, forming a conical surface extending radially inwardly from said inner wall of the interconnecting piece, providing an opening in said conical surface coaxial with said inner wall of the annular interconnecting member, forming a bearing surface on the exterior of said body circumscribing said protuberance, fitting the opening over the protuberance, engaging a corresponding surface on said interconnecting member with said bearing surface when the interconnecting member is fitted over the protuberance, flanging the wall of said protuberance radially outwardly into engagement with the conical surface, and forming cooperating surfaces on the protuberance and the interconnecting piece to immobilize the interconnecting piece against rotation relative to the body.

2. Method as claimed in claim 1, wherein said protuberance is cut out in a shape projecting from the body.

3. Method as claimed in claim 1, wherein the protuberance is formed by drawing radially outwardly a localized portion of the wall of said body.

4. Method as claimed in claim 1, wherein said interconnecting piece is force-fitted onto the protuberance.

* * * * *